May 3, 1927.
A. T. CHRISTIAN
1,627,480
COMBINATION DUST CAP AND LOCK NUT
Filed May 21, 1926
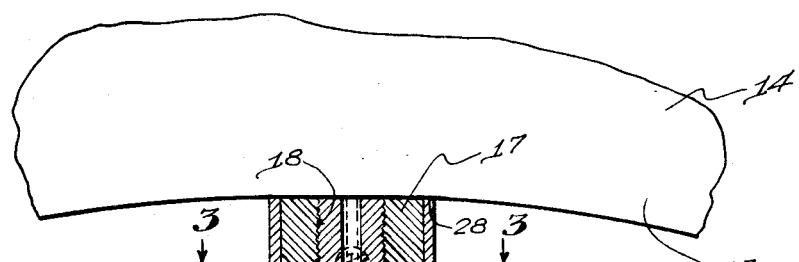
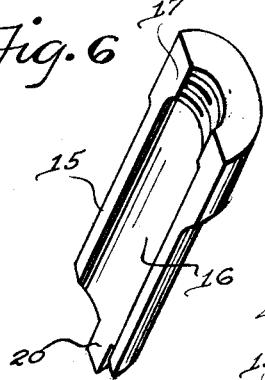
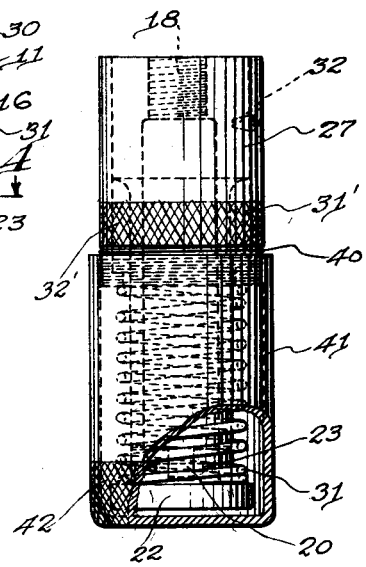
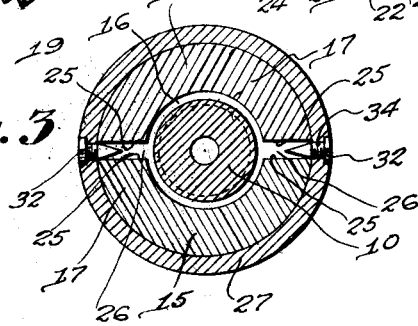
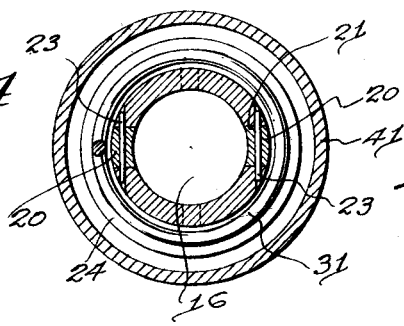
ARTHUR T. CHRISTIAN
INVENTOR
BY Victor J. Evans
ATTORNEY Patented May 3, 1927.

1,627,480

UNITED STATES PATENT OFFICE.

ARTHUR T. CHRISTIAN, OF GLENVIEW, ILLINOIS.

COMBINATION DUST CAP AND LOCK NUT.

Application filed May 21, 1926. Serial No. 110,763.

This invention relates to certain novel improvements in combination dust caps and lock nuts for pneumatic tire valves and has for its principal object the provision of an improved construction of this character which will be highly efficient in use and economical in manufacture.

The invention contemplates a device of this character constructed in a manner whereby when in applied position the device can be removed without the use of tools. In devices of this character with which I was familiar prior to my invention, the pneumatic tire valve is usually clamped to the felly of a wheel by means of a lock nut having a threaded shank receiving a dust cap. To remove the dust cap and in most instances to remove the lock nut considerable time is wasted due to the fact that the lock nut being threaded tightly against the felly it is necessary to employ a pair of pliers or an S wrench. It, therefore, is one of the main objects of the invention to provide a combination dust cap and lock nut whereby to remove the device it is not necessary to employ tools.

Other objects will appear hereinafter.

The invention consists in the novel combination and arrangement of parts to be hereinafter described and claimed.

The invention will be best understood by reference to the accompanying drawings illustrating the preferred form of construction and in which:

Figure 1 is a typical side elevational view of the invention,

Figure 2 is a vertical sectional detail view of the same showing the invention in applied position, Figure 3 is a sectional detail view taken substantially on line 3—3 of Fig. 2, Figure 4 is a sectional detail view taken substantially on line 4—4 of Fig. 2, Figure 5 is a perspective view of one of the guiding screws embodied in the invention, and Figure 6 is a perspective view of one of the clamping members embodied in the invention.

To better demonstrate the application of the invention I have illustrated in the drawing a pneumatic tire valve structure 10 including a valve cap 11 of any approved construction.

The tire valve structure is threaded externally as at 12 and projects from the felly 13 of the wheel 14.

With this valve structure my improved construction is associated.

The device embodying the invention comprises clamping members 15 substantially semi-circular in cross section to define a passage 16 for the accommodation of the valve structure 10. The felly engaging end portions of the clamping members are enlarged as shown in Figure 2 of the drawing to provide a bearing head 17. The felly engaging end portions are likewise substantially semi-circular in cross section and are threaded internally as at 18 for engagement with the external threads of the valve structure 10.

The opposite end portions 19 of the clamping members 15 define ears 20 adapted to be received in recesses 21 formed in a retaining head 22. These ears 20 are pivotally connected to the retaining head 22 through the medium of pin members 23. This retaining head defines a flange 24 for reasons hereinafter understood.

As shown in Figure 3 of the drawing the adjacent edges 25 of the clamping members are spaced from each other to provide spaces 26 for reasons hereinafter understood.

Slidably associated with the clamping members 15 is a sleeve 27 of a diameter sufficient to permit smooth sliding relation between the sleeve and the bearing head 17 defined by the felly engaging portions of the clamping members. This sleeve 27 has an end portion 28 which is adapted to yieldably bear against the felly 13. The opposite end portion of the sleeve defines an inturned flange 29 defining an opening 30 of sufficient diameter to permit a nice fit between this end portion of the sleeve and the clamping members 15.

Disposed between the flange 29 and the flange 24 and embracing the clamping members 15 is an expansion spring 31 which normally serves to hold the sleeve 27 in bearing relation with the felly 13.

This sleeve 27 is slidably connected to the clamping members 15 for rotation therewith through the medium of screw members 32. These screw members include threaded shank portions 33 threaded in tap holes 34 formed in the sleeve 27. The inner end portions of these screws are swedged as at 35 to provide wedge shaped ends 36 adapted to work in the spaces 26 defined by the spaced edges 25 of the clamping members.

In use, to apply the device the sleeve 27 is manually moved toward the retaining head 22 against the action of the spring 31 until the end portion 28 of the sleeve is disposed over the reduced portion 28' of the clamping members 15. When this is accomplished the clamping members are positioned with respect to the valve structure 10 whereby when the device is moved longitudinally of the valve structure toward the felly 13 the valve structure will freely enter the passage 16. After this has been accomplished holding pressure on the sleeve 27 is released and the sleeve 27 by action of the spring member 31 is urged to move relatively to the clamping members to dispose the end portion 28 over the bearing head 17 or the enlarged end portion of the clamping members. In this position of the sleeve with respect to the clamping members it is manifest that outward pivotal movement of the clamping members about their pivots 23 will be restricted and that such clamping members will be held in operative engagement with the valve structure 10 whereby to clamp the valve structure to the felly the device embodying the invention is rotated in a clockwise direction to thread itself along the valve structure until the bearing head 17 firmly bears against the felly 13. When this has been accomplished it is manifest from the description herein taken in connection with the accompanying drawing that the sleeve 27 will be held in bearing relation with the felly through the action of the spring 31.

To facilitate rotating of the sleeve to urge threading rotation to the clamping members the end portion 31' of the sleeve is knurled as at 32'.

To remove the device from the valve structure 10 it is only necessary to firmly grasp the end portion 31' of the sleeve and draw this sleeve in a direction against the action of the spring 31 until the end portion 38 of the sleeve clears the enlarged bearing head 17 at which time the clamping members will be in loose condition with respect to the valve structure and by further drawing action of the sleeve against the action of the spring member the clamping members will be withdrawn from operative engagement with the valve structure.

Should, at any time, rust accumulate between the threads 12 and 18 whereby the clamping members 15 will not of their own selves move away from each other, separation of these clamping members is accomplished through the medium of the guiding screws 32. As these guiding screws when in operative position have their wedge shaped portions disposed in the spaces 26 the narrow portion of each of the wedge shaped portions is disposed transversely of the space 26 thereby to separate the clamping jaws either one of the guiding screws is turned in an anti-clockwise direction whereby to wedge the wedge shaped end portion between the spaced edges of the sleeve to force the clamping members in pivotal movement away from each other. It will be apparent that this method of separating the clamping members is used when the sleeve 27 is disposed in a position with its end portion 28 clear of the enlarged bearing head 17.

As shown in Fig. 1 of the drawing the end portion 31' of the sleeve 27 is externally threaded as at 40 for threaded engagement with a cap 41 knurled as at 42 to facilitate connecting the cap 41 to the sleeve 27. This cap 41 provides a housing for the spring 31 and protects this spring from accumulation of dirt and other foreign particles of matter.

From the foregoing description it is manifest that my improved invention not only results in a dust cap for a pneumatic tire valve structure but also serves as a lock nut for the valve structure.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

The invention having been set forth, what I claim as new and desire to secure by Letters Patent is:

1. The combination with a pneumatic tire valve structure, of two clamping members each substantially semi-circular in cross section defining a passage adapted to receive the valve structure and defining corresponding enlarged portions providing a bearing head, means pivotally connecting the opposite corresponding end portions of the two members together to permit said members to pivot toward and away from each other, a member movable relative to the two members adapted when disposed over the enlarged portions to restrict pivotal movement of the two members away from each other and when disposed over the remaining portions of the two members to permit pivotal movement of the two members away from each other, and yieldable means for moving the member into position over the enlarged portions of the two members.

2. A combination dust cap and lock nut for a pneumatic tire valve structure including a retaining head, clamping members substantially semi-circular in cross section disposed with adjacent corresponding longitudinal edges in spaced relation with respect to each other and defining a passage for the accommodation of the valve structure, means for pivotally connecting the clamping members to the retaining head, enlarged portions defined by the clamping members and substantially semi-circular in shape and threaded internally for threaded engagement with the valve structure, a sleeve member slidably associated with the clamping members and adapted to be moved over the enlarged portions to restrict pivotal movement of the clamping members, a resilient member disposed between the retaining head and the sleeve for urging the sleeve over said enlarged portions, and guiding members for the sleeve and including end portions projecting into the spaces between the longitudinal edges of the clamping members.

3. A combination dust cap and lock nut for a pneumatic tire valve structure including a retaining head, clamping members substantially semi-circular in cross section disposed with adjacent corresponding longitudinal edges in spaced relation with respect to each other defining a passage for the accommodation of the valve structure, means for pivotally connecting the clamping members to the retaining head, enlarged portions defined by the clamping members and substantially semi-circular in shape and threaded internally for threaded engagement with the valve structure, a sleeve member slidably associated with the clamping members and adapted to be moved over the enlarged portions to restrict pivotal movement of the clamping members, a resilient member disposed between the retaining head and the sleeve for urging the sleeve over said enlarged portions, and guiding members for the sleeve and including end portions projecting into the spaces between the longitudinal edges of the clamping members, said projecting portions of said guiding members being substantially wedge shaped adapted when the guiding members are rotated to be wedged in the spaces to separate the clamping members when the sleeve is disposed from the enlarged portions of the clamping members.

In testimony whereof I affix my signature.

ARTHUR T. CHRISTIAN.